United States Patent
Rzyski

(10) Patent No.: US 7,787,840 B1
(45) Date of Patent: Aug. 31, 2010

(54) SHAPE MEMORY ALLOY RECEIVER

(76) Inventor: Eugene Rzyski, 1454 Via Encino, Fallbrook, CA (US) 92028

( * ) Notice: Subject to any disclaimer, the term of this patent is extended or adjusted under 35 U.S.C. 154(b) by 485 days.

(21) Appl. No.: 11/870,372

(22) Filed: Oct. 10, 2007

Related U.S. Application Data

(60) Provisional application No. 60/829,027, filed on Oct. 11, 2006.

(51) Int. Cl.
*H04B 1/18* (2006.01)
*H04B 7/00* (2006.01)
(52) U.S. Cl. .............. 455/130; 455/193.1; 455/195.1; 455/269; 343/745; 343/861
(58) Field of Classification Search ... 455/193.1–193.3, 455/120–123, 269, 274, 575.7; 343/745, 343/860–861
See application file for complete search history.

(56) References Cited

U.S. PATENT DOCUMENTS

| | | | | |
|---|---|---|---|---|
| 3,818,480 | A * | 6/1974 | West .......................... 342/435 |
| 5,673,054 | A * | 9/1997 | Hama ......................... 343/744 |
| 6,140,924 | A * | 10/2000 | Chia et al. ............... 340/572.5 |
| 6,176,432 | B1 * | 1/2001 | Miyaura ..................... 235/487 |
| 6,208,847 | B1 * | 3/2001 | Kosuga ....................... 455/142 |
| 6,400,274 | B1 * | 6/2002 | Duan et al. .............. 340/572.7 |
| 6,738,025 | B2 * | 5/2004 | Carrender ................... 343/860 |
| 7,193,568 | B2 * | 3/2007 | Watanabe ............ 343/700 MS |
| 2008/0258731 | A1 * | 10/2008 | Smith et al. ................. 324/322 |

* cited by examiner

*Primary Examiner*—Simon D Nguyen
(74) *Attorney, Agent, or Firm*—The Eclipse Group LLP

(57) ABSTRACT

In one embodiment, a frequency agile receiver is provided that includes an antenna: a first diode having its anode coupled to ground through a first conductor; a second diode having its anode coupled to the cathode of the first diode through a second conductor, the antenna coupling to the second conductor, the second diode having its cathode coupled to an output node through a third conductor, wherein at least one of the first, second, and third conductors comprises a shape memory alloy conductor; and a tuning circuit adapted to drive a bias current into the shape memory alloy conductor.

3 Claims, 1 Drawing Sheet

SHAPE MEMORY ALLOY RECEIVER

CROSS REFERENCE TO RELATED APPLICATIONS

This application claims priority under Section 119(e) to U.S. Provisional titled "Aircraft Monitoring and Security System," Application Ser. No. 60/829,027, filed Oct. 11, 2006, all of which is incorporated into this application by reference in their entirety.

BACKGROUND OF THE INVENTION

1. Field of Invention

This invention generally relates to receivers and more particularly to a receiver having a tunable frequency response through the use of shape memory alloy.

2. Related Art

Wireless protocols such as spread spectrum communication and anti-jamming military applications often require frequency agile receivers. For example, a military user may transmit in a pseudo-random fashion across a variety of wavelengths to provide security against eavesdropping. A frequency agile receiver must change its frequency response quickly to receive such signals. To provide such frequency agility, such receivers tend to be expensive and complex.

Accordingly, there is a need in the art for low-cost frequency agile receivers.

SUMMARY

In accordance with a first aspect of the invention, a frequency agile receiver is provided that includes: an antenna; a first diode having its anode coupled to ground through a first conductor; a second diode having its anode coupled to the cathode of the first diode through a second conductor, the antenna coupling to the second conductor, the second diode having its cathode coupled to an output node through a third conductor, wherein at least one of the first, second, and third conductors comprises a shape memory alloy conductor; and a tuning circuit adapted to drive a bias current into the shape memory alloy conductor.

The invention will be more fully understood upon consideration of the following detailed description, taken together with the accompanying drawings.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following FIGURES. The components in the FIGURES are not necessarily to scale, emphasis instead being placed upon illustrating the principles of the invention. In the FIGURES, like reference numerals designate corresponding parts throughout the different views.

DETAILED DESCRIPTION

Figure 1:
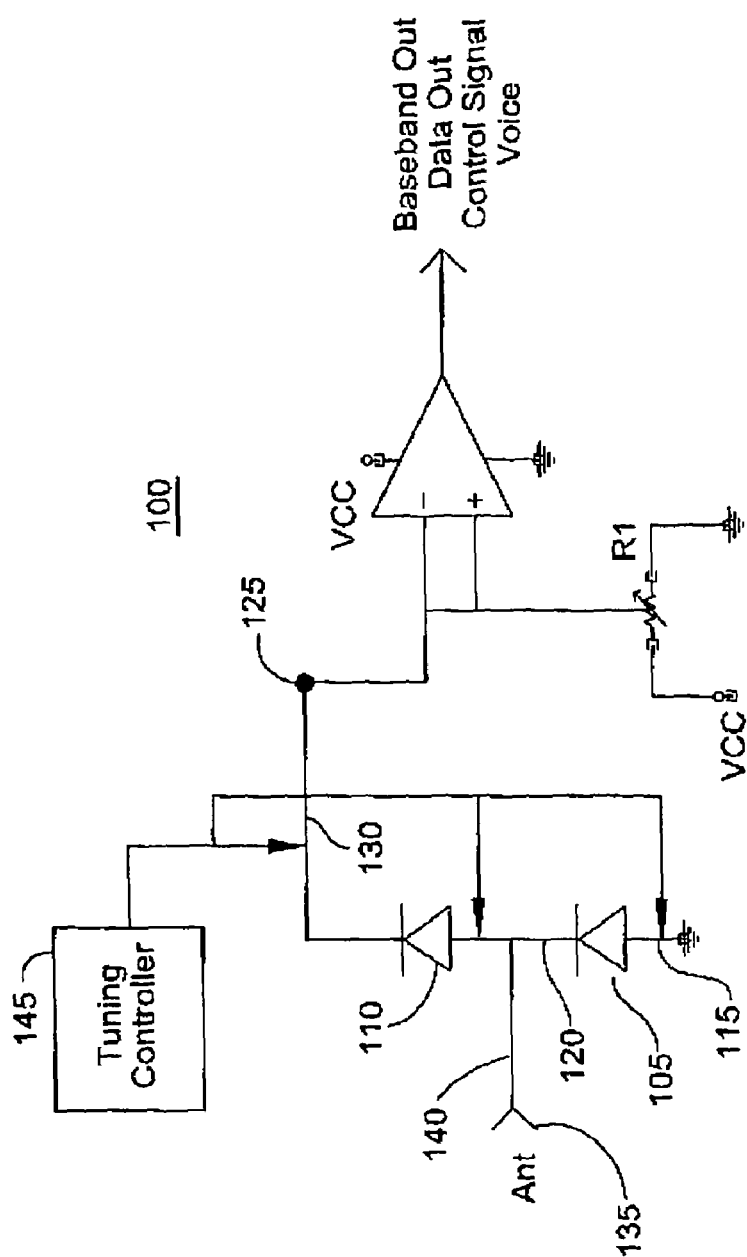
FIG. 1 is a block diagram of an example of an implementation of a frequency agile receiver in accordance with the present invention.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

To provide a low-cost frequency agile receiver, the unique properties of shape memory alloys are exploited. For instance, a shape memory alloy such as Nitinol (Nickel titanium naval ordnance laboratory) may transform from the martensite state at low temperatures to the austenite state at high temperatures. In embodiments of the present invention, a tuning circuit drives shape memory alloy (SMA) conductors with a tuning current, thereby heating the conductors into the austenite state. Conversely, the tuning circuit may decrease the tuning current such that the SMA conductors cool into the martensite state. To allow for the corresponding contraction and expansion, an SMA conductor may include a coiled section around a non-ferrous core such as brass or copper. Alternatively, each SMA conductor may comprise an uncoiled trace on the circuit board or substrate holding the frequency agile receiver.

Referring now to FIG. 1, an exemplary frequency agile receiver 100 is illustrated. A first diode 105 is in series with a second diode 110. The anode of diode 105 couples to ground through a first SMA conductor 115 whereas the cathode of diode 105 couples to the anode of diode 110 through a second SMA conductor 120. Similarly, the cathode of diode 110 couples to an output node 125 through a third SMA conductor 130. An antenna 135 couples to SMA conductor 120 through a fourth SMA conductor 140. Alternatively, antenna 135 may couple to SMA conductor 120 through a non-SMA conductor.

A tuning controller 145 drives a DC current through the SMA conductors. Depending upon the amplitude of this current, SMA conductors 115, 120, and 130 are driven into the austenite state through Ohmic heating. Conversely, if the current is reduced, SMA conductors 115, 120, and 130 may cool into the martensite state. Each SMA conductor has a characteristic electrical length that changes as the conductors transition from one state to another. In turn, this changed electrical length affects the amount of distributed inductance and capacitance that these conductors provide. This reactance from the SMA conductors provides a tuned circuit such that the diodes react to some frequencies but not others. Because the characteristics of this tuned circuit changes as the SMA conductors transition from the austenite to the martensite states, the tuning controller controls the RF frequencies being rectified at output node 125.

Advantageously, the series connection of the diodes enhances the signal-to-noise of the rectified RF signal at output node 125. This enhancement arises because each diode successively increases the DC power in the resulting rectified signal. Any suitable amplifier may be used to amplify the rectified RF power at output node 125. For example, an operational amplifier 150 may amplify the difference between the rectified RF signal at output node 125 and a variable voltage from a potentiometer R1. In this fashion, depending upon the modulation applied to the RF signal received at antenna 135, amplifier 150 may provide, for example, a baseband data output signal, a control signal, or a voice signal as its output signal. It will be appreciated that the bias current provided by tuning controller 145 is being shown in a conceptual fashion in that diodes 110 and 115 should be isolated through, for example, DC blocking capacitors from any DC bias current. In that regard, each SMA conductor could have a separate sink node so that DC bias current can flow through the conductor as supplied by the tuning controller.

Although the invention has been described with respect to particular embodiments, this description is only an example of the invention's application and should not be taken as a limitation. For example, although tuning, ability is enhanced though the provision of separate SMA conductors 115, 120, and 130, a frequency agile receiver can also be implemented if two of these SMA conductors are replaced by conventional non-SMA conductors. Consequently, the scope of the invention is set forth in the following claims. Accordingly, the invention is not to be restricted except in light of the attached claims and their equivalents.

What is claimed is:

1. A frequency agile receiver, comprising:

an antenna;

a first diode having its anode coupled to ground, through a first conductor; a second diode having its anode coupled to the cathode of the first diode through a second conductor, the antenna coupling to the second conductor, the second diode having its cathode coupled to an output node though a third conductor, wherein at least one of the first, second, and third conductors comprises a shape memory alloy conductor; and a tuning circuit adapted to drive a bias current into the shape memory alloy conductor.

2. The frequency agile receiver of claim 1, wherein each of the first, second, and third conductors comprises a shape memory alloy conductor.

3. The frequency agile receiver of claim 2, wherein each shape memory alloy conductor comprises Nitinol.

\* \* \* \* \*